Dec. 16, 1930.    C. H. MORROW    1,785,387
DIRT TRAP FOR THERMOSTATS
Filed July 9, 1927

Inventor
Clarence H. Morrow
By Brockett & Hyde
Attorneys

Patented Dec. 16, 1930

1,785,387

UNITED STATES PATENT OFFICE

CLARENCE H. MORROW, OF CLEVELAND, OHIO, ASSIGNOR TO THE HOTSTREAM HEATER COMPANY, OF CLEVELAND, OHIO, A CORPORATION OF OHIO

DIRT TRAP FOR THERMOSTATS

Application filed July 9, 1927. Serial No. 204,652.

This invention relates to dirt traps for thermostatic regulators, such as are used for controlling the flow of gas to a burner for domestic water heaters, gas stoves, or other devices burning gas.

The object of the invention is to provide a very simple device which is connected in the piping system and protects the thermostatic valve against foreign deposits which might interfere with its operation, and which moreover, is satisfactory for the purpose in practically any position in which it may be used.

Further objects of the invention are in part obvious and in part will appear more in detail hereinafter.

Figure 1:
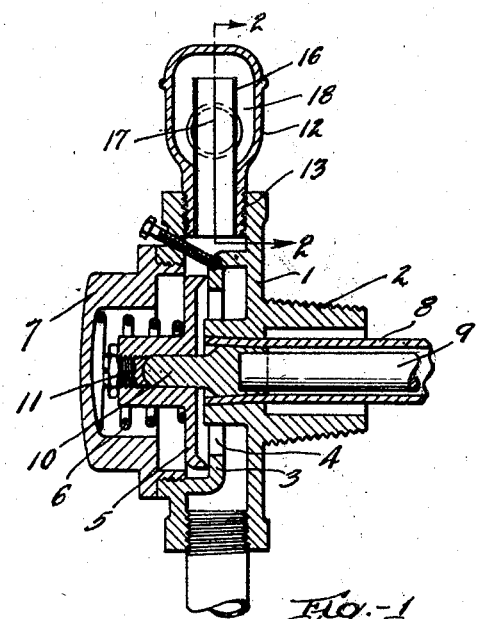
Figure 2:
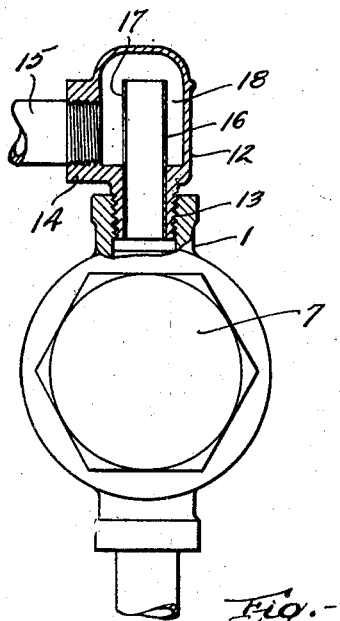
Figure 3:
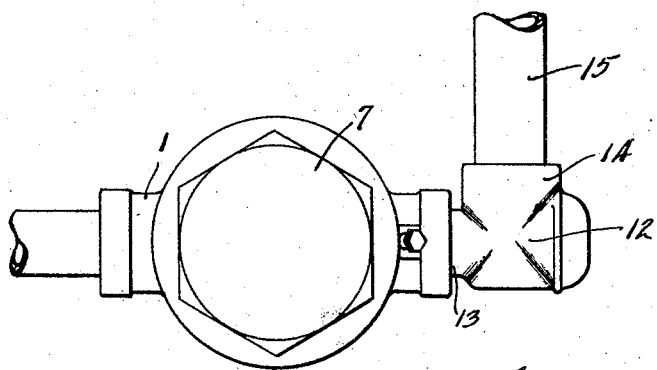

In the drawings, Fig. 1 represents a sectional elevation through a thermostat provided with my improved trap; Fig. 2 is an elevation from the left in Fig. 1, the trap itself being in section on the line 2—2, Fig. 1; and Fig. 3 is an elevation showing another position of the trap.

The invention is capable of use on any type of thermostat and in the drawings, for purposes of illustration, has been shown in connection with a simple form of thermostat adapted to be screwed into the side of a domestic hot water tank or into the piping system in a generally horizontal position. With such thermostats it is the custom of plumbers to lead the gas to the thermostat from above, because the thermostat is usually located at a higher level than the burner and the simplest piping arrangement carries the gas downwardly to the thermostat and then downwardly to the burner.

Referring to the drawings, the thermostatic regulator shown includes a valve having a casing 1, provided with a threaded extension 2 adapted to be screwed into the boiler or a part of the piping system. The cavity in the valve is divided into two chambers by a cross wall 3 in which is a large opening 4 through which the gas flows from the supply pipe at the top to the outlet pipe at the bottom, the flow of gas being controlled by a valve 5 moved toward its seat by a compression spring 6 within the cap 7 and moved away from its seat to permit gas flow by contraction of the copper or other expansible tube 8 in which is mounted the relatively non-expansible member, such as the steel or carbon rod 9, the valve end of which is provided with a head 10 entering and seating within the valve 5, the abutment seat therefor consisting of an adjustable screw 11 for regulating the temperature at the gas shut off point.

Above the thermostat, or, more accurately, at its supply end, is mounted the trap of the present invention. It comprises a hollow casing 12 having a threaded extension 13 for attachment to the thermostat and provided with a laterally extending boss 14 internally threaded for the gas supply pipe 15. Within the chamber of the casing is a suitable baffling member, such as the tube 16, which may be a simple piece of pipe suitably anchored within the casing in the manner shown in the drawings. More particularly, this baffle may be a piece of tubing split longitudinally, as at 17, and of suitable size to be held frictionally in position when driven into the male extension 13. It extends upwardly beyond the lateral opening for the pipe 15.

When connected as shown in Fig. 1, this dirt trap baffles any access to the valve mechanism of foreign matter from the gas supply pipe. When the latter is brought down from above and is screwed directly into the thermostat it sometimes happens that after some period of use a rap or jar on the pipe dislodges particles of scale, dirt, or other foreign matter which pass with the gas into the valve mechanism and lodge between the valve 5 and its seat on the wall 3, preventing the valve from closing and permitting uninterrupted flow of gas. Also, in installing these thermostats the plumber sometimes wipes the threads of the supply pipe with an excess of white lead or paint which drops off from the pipe either before, during, or after connection and finds its way into the valve mechanism. In either case, with the present trap, as shown in Fig. 1, all dirt and foreign matter is collected in the chamber 18 around the hollow tube 16 and cannot rise above the open upper end of the tube and thus does not gain actual entrance to the valve casing. It therefore cannot interfere with valve operation.

The fitting is also capable of use in other positions, such as shown in Fig. 3, where it is so located that the lateral connection 14 is vertical and the threaded extension 13 is horizontal. The tube 16 therefore lies horizontally but, again, any foreign matter conducted by the pipe 15 to the trap lodges in the chamber 18 around the tube 16 and is not conducted to the more delicate valve mechanism. In other positions, such as when both the supply connection 14 and thermostatic connection 13 are horizontal, the fitting is equally satisfactory for the purpose.

What I claim is:

A dirt trap for thermostatic regulators, comprising a one-piece hollow casing having a closed end and provided at the other end with an elongated extension threaded externally for direct connection with a thermostatic regulator, the threaded extension having a through bore, a split tube press-fitted in said bore and extending into the chamber of the casing, said casing having a lateral opening towards the extending portion of said tube and internally threaded for connection with a gas supply pipe, whereby the trap may take the place of a standard elbow pipe fitting and will serve its purpose in any position.

In testimony whereof I hereby affix my signature.

CLARENCE H. MORROW.